United States Patent
Lu et al.

(10) Patent No.: US 9,406,416 B2
(45) Date of Patent: Aug. 2, 2016

(54) METHOD OF PRODUCING EXTREMELY THICK INSULATION COATING ON SURFACE OF ELECTRICAL STEEL

(75) Inventors: Yongqiang Lu, Shanghai (CN); Chunguo Lv, Shanghai (CN); Zhicheng Wang, Shanghai (CN); Bin Chen, Shanghai (CN); Xiao Chen, Shanghai (CN); Shishu Xie, Shanghai (CN)

(73) Assignee: BAOSHAN IRON & STEEL CO., LTD, Shanghai (CN)

( * ) Notice: Subject to any disclaimer, the term of this patent is extended or adjusted under 35 U.S.C. 154(b) by 204 days.

(21) Appl. No.: 14/348,357

(22) PCT Filed: Dec. 14, 2011

(86) PCT No.: PCT/CN2011/083914
§ 371 (c)(1),
(2), (4) Date: Jun. 13, 2014

(87) PCT Pub. No.: WO2013/056496
PCT Pub. Date: Apr. 25, 2013

(65) Prior Publication Data
US 2015/0064343 A1 Mar. 5, 2015

(30) Foreign Application Priority Data
Oct. 17, 2011 (CN) .......................... 2011 1 0315303

(51) Int. Cl.
*H01B 13/06* (2006.01)
*B05C 9/04* (2006.01)
(Continued)

(52) U.S. Cl.
CPC *H01B 13/06* (2013.01); *B05C 9/04* (2013.01); *B05D 1/28* (2013.01); *C09D 5/08* (2013.01);
(Continued)

(58) Field of Classification Search
None
See application file for complete search history.

(56) References Cited

U.S. PATENT DOCUMENTS

| 6,277,196 B1 | 8/2001 | Woodman et al. |
| 2011/0212335 A1* | 9/2011 | Takeda ................ C22C 38/02 428/458 |
| 2012/0324992 A1* | 12/2012 | Lu ........................ G01B 1/00 73/150 R |

FOREIGN PATENT DOCUMENTS

| CN | 101082483 | 12/2007 |
| CN | 101209440 | 7/2008 |

(Continued)

OTHER PUBLICATIONS

The International Search Report dated Jul. 14, 2012, in the corresponding PCT/CN2011/083914 filed on Dec. 14, 2011.
(Continued)

*Primary Examiner* — Erma Cameron
(74) *Attorney, Agent, or Firm* — Hovey Williams LLP

(57) ABSTRACT

A method of producing an extremely thick insulation coating on a surface of an electrical steel, comprises the following steps: 1) preparing a coating liquid—stirring sufficiently the coating liquid for 0.1~4 hours, with the viscosity of the coating liquid being within 10~80 S; 2) coating a strip steel—using a double-roller or a tri-roller coating machine, wherein the film thickness and evenness can be controlled by adjusting different parameters; 3) baking the coating—using three sections, that is, a drying section, a baking section and a cooling section, to bake the coating, wherein the temperature in the drying section is 100~400° C., the temperature in the baking section is 200~370° C.; the time in the whole drying and solidification section is 33~144 seconds, wherein the time in the drying section is 9~39 seconds, and the baking time is 24~105 seconds; wherein in the baking process, the strip steel having been coated is conveyed in a non-contact way, in particular, the strip steel is conveyed by blowing pressure-adjustable air onto the lower surface to make it float; the air pressure is 0~2000 Pa; the wet film is kept out of contact with the furnace rollers before it is solidified, guaranteeing that the surface of wet film is intact; 4) online detecting the film thickness.

6 Claims, 1 Drawing Sheet

(51) Int. Cl.
- H01B 13/00 (2006.01)
- B05D 1/28 (2006.01)
- C09D 5/08 (2006.01)
- B05D 7/14 (2006.01)
- H01F 1/18 (2006.01)
- B05D 3/02 (2006.01)
- B05D 3/04 (2006.01)

(52) U.S. Cl.
CPC ............ *C09D 5/084* (2013.01); *H01B 13/0016* (2013.01); *B05D 3/0272* (2013.01); *B05D 3/0413* (2013.01); *B05D 7/14* (2013.01); *B05D 2202/10* (2013.01); *B05D 2252/10* (2013.01); *H01F 1/18* (2013.01)

(56) References Cited

FOREIGN PATENT DOCUMENTS

| | | |
|---|---|---|
| CN | 101581631 | 11/2009 |
| CN | 101722140 | 6/2010 |
| CN | 102212659 | 10/2011 |
| EP | 0577124 | 5/1994 |
| JP | S57-156070 | 9/1982 |
| JP | S57-201562 | 12/1982 |
| JP | S63-107773 | 5/1988 |
| JP | H02-164483 | 6/1990 |
| JP | H03-177578 | 1/1991 |
| JP | H03-077675 | 3/1991 |
| JP | H05-220441 | 8/1993 |
| JP | H10277473 | 10/1998 |
| JP | H11-010078 | 1/1999 |
| JP | 2002069657 | 3/2002 |
| JP | 2009-233604 | 10/2009 |

OTHER PUBLICATIONS

Yu, Quan-He, "Prodution Technology of Roller Painting for Aluminum Coil," Painting and Finishing, Sep. 2011, vol. 33, No. 9, Serial No. 222.

* cited by examiner

METHOD OF PRODUCING EXTREMELY THICK INSULATION COATING ON SURFACE OF ELECTRICAL STEEL

CROSS-REFERENCE TO RELATED APPLICATION

This Application is a National Stage entry under 35 U.S.C. 371 of International Patent Application No. PCT/CN2011/083914, filed Dec. 14,2011.

FIELD OF THE INVENTION

The present invention relates to applying coating and film-forming techniques on a surface of a strip steel, in particular to the method of producing an extremely thick insulation coating on a surface of an electrical steel.

BACKGROUND OF THE INVENTION

Currently, with the rapid development of China's industry, the demand for electrical power rises substantially, and considering the request of environment protection, China has progressively expanded investment on nuclear power, hydropower, and solar power generation. Large hydropower generator or nuclear power generator has high requirements on electrical steels, especially on the insulation thereof. Therefore, a technique for applying extremely thick environment-friendly insulation coating on surfaces of strip steels is needed.

Currently, coatings from Dupont, Rembrandtin, Kluthe and the like are mainly used as the extremely thick insulation coating on surfaces of electrical steels. Usually, a vertical double-roller coating machine is utilized to apply coating, wherein the coating roller is a grooved or slotted roller, and it is also a driven roller, being rotated by the motion of the strip steel. If the speed of the process line fluctuates, the film thickness control may be affected adversely, resulting in low precision of coating thickness. Besides, the coating produced by the grooved roller is prone to being uneven, causing non-uniformity of insulation, and failing to meet the requirements of lamination. The ways of "baking" after coating include primarily induction heating, hot-air drying, infrared heating and near-infrared heating, wherein the induction heating equipments are difficult to install, and it may result in uneven heating in width of strip steels, thereby causing non-uniform coating properties; while the infrared heating device and the near-infrared heating device have a high heating precision, they need tremendous investment, and feature complicated processes, which may go against reducing production cost.

SUMMARY OF THE INVENTION

The object of the present invention is to provide a method of producing extremely thick insulation coating on a surface of an electrical steel. There is an extremely thick insulation coating with excellent properties on the surface of the electrical steel, and the thickness of the coating is even, between 2 μm and 10 μm. It also has excellent interlamination resistance performance, being applicable to large hydropower generation and nuclear power generation.

To achieve the above-mentioned object, the present invention takes the following solutions:

The method of producing an extremely thick insulation coating on surface of electrical steel includes the following steps:

1) Preparing a coating liquid:

stirring sufficiently the coating liquid for 0.1~4 hours, then diluting it with water or solvent to make sure that the viscosity is within 10~80 S (measured with a DIN4 viscosity cup). The solvent for adjusting the viscosity may comprise ethylene glycol butyl ether or butyl glycol.

In view of the high content of solid in the extremely thick coating and its high viscosity (usually over 100 S), and in order to guarantee the uniformity of the coating liquid, firstly the coating liquid is stirred for 0.1~4 hours by a pneumatic adjustable stirrer (the rotating speed thereof is about 100~1000 rpm), then diluting the coating liquid, and measuring its viscosity with a viscometer.

Lower viscosity of the coating liquid may easily result in quick coating and generation of bubbles, and hence affecting the surface quality, while higher viscosity of the coating liquid may be not good for its leveling property, prone to causing defects like streaks and holidays. Thus, to ensure that the coating process matches well with the speed of strip steel, and to guarantee the leveling property of the coating liquid and the uniformity of the coating, choosing a reasonable viscosity is needed. The viscosity of the present invention is within 10~80 S. Additionally, it should further be noted that during stirring, there should not be lots of bubbles in the coating liquid.

The coating liquid the present invention uses is primarily from Dupont, Rembrandtin, Kluthe and the like, which is essentially the mixture of inorganic components and organic components, but products from different companies include different solid components, which consist mainly of $BaSO_4$, $CaSO_4$, $CaCO_3$, $TiO_2$, N—N-dimethylethanolamine, 2-butoxyethanol, 1-butoxy-2-propanol, carbon black, polyisobutene, n-butyl alcohol and the like.

The content of $BaSO_4$, $CaSO_4$, $CaCO_3$ typically is 30-70%, the content of $TiO_2$ typically is 5-15%, the content of N—N-dimethylethanolamine, 2-butoxyethanol, 1-butoxy-2-propanol, carbon black, polyisobutene, n-butyl alcohol typically is 0.1-1%.

Due to that the specific coatings are available, they will be not described in detailed.

2) Coating the strip steel:

using a double-roller or a tri-roller coating machine to apply coating, so as to determine a method of adjusting the film thickness, such as adjusting the parameters of speed ratio, pressure, and gap of rollers, thereby obtaining a film of even thickness and suitable precision. The double-roller or tri-roller coating machine is used in two coating ways comprising co-current coating and counter-current coating.

When using a tri-roller coating machine, the thickness and evenness of the coating may be adjusted in due time by setting the speed ratios of the three rollers, the pressure between the coating roller and the pick-up roller, as well as the gap between the pick-up roller and the metering roller. Preferably, the speed ratios of the coating roller and the pick-up roller are usually 0.2~1.2, the pressure between the coating roller and the pick-up roller is 0.1~10 KPa, and the gap between the pick-up roller and the metering roller is 80~150 μm.

When using a double-roller coating machine, the thickness and evenness of the coating may be adjusted in due time by setting the speed ratios of the two rollers and the pressure between the coating roller and the pick-up roller. Preferably, the speed ratios of the pick-up roller and the coating roller are 0.2~1.5, and the pressure between them is 1~50 KPa.

3) Baking the coating:

The present invention uses burner nozzles to heat the air, and the heated air circulates through a vertical circulation bellow, drying the wet film on the surface of the strip steel and solidifying it, while the moisture in the coating after evaporation is expelled into the atmosphere through an exhaust fan.

According to the properties of the film formed from a wet form, during the baking step, a tri-section heating and cooling process is used to perform baking. The three sections are: a drying section, a baking section, and a cooling section, wherein the temperature in the drying section is 100~400° C., the temperature in the baking section is 200~370° C. The time in the whole drying and solidification stage is 33~144 s, wherein the time for drying the wet film is 9~39 s, and the time for baking is 24~105 s; a coating of 2~10 µm is finally formed.

Conveying the strip steel:

In the whole drying section and the baking section after coating, the present invention utilizes a conveying device in non-contact with the strip steel. The conveying device can blow pressure-adjustable air to float the strip steel with wet films. Under the floating effect of the conveying device in the baking furnace, the strip steel with wet films is kept out of contact with the furnace rollers before the wet films are solidified, thus guaranteeing that the surface of wet film is intact. Besides, the air pressure is 1~2000 Pa.

Moreover, the present invention further includes a step 4): online detecting the film thickness. The present invention uses the conventional online detection method to continuously detect the film thickness on both the upper and the lower surfaces of the strip steel, and has the function of feeding back the film thickness. By comparing the result of the film thickness during the online detection with a target thickness, the parameters in the coating machine are adjusted in due time to achieve target thickness, so as to ensure the uniform film thickness.

The extremely thick coating on the surface of strip steel produced by the process according to the present invention has a uniform thickness, good adhesion, strong scratch resistance, and excellent electrical insulation, thus being applicable for the coating of electrical steels in large hydropower generation and nuclear power generation.

The main features of the present invention are as follows.
1. The viscosity of the coating liquid of the extremely thick coating is 10~80 S, with good leveling property and coatability.
2. A double-roller or a tri-roller coating machine is used for applying coating, so as to determine the method of adjusting and controlling the film thickness, and hence controlling the film thickness precisely.
3. The methods of open flame burner heating and hot air circulation are used for forming the film, and heating sections at different temperatures are provided, so as to get good coatings; the solidification time is 33~144 seconds, thereby guaranteeing that the coating features excellent adhesion and insulation.
4. A conveying device non-contact with the strip steel is utilized to convey the strip steel, so as to ensure the completeness of the coating.
5. The film thickness of the environment-friendly coating is controlled in an online feedback way, and thus being monitored effectively, thereby ensuring the evenness of the film thickness.

The present invention can produce continuously those coating products with a thickness greater than 2 µm, thus meeting different requirements from different users on film thickness and the properties of the coating itself.

DETAILED DESCRIPTION OF THE INVENTION

Thereinafter the process of the present invention will be further described in conjunction with the embodiments.

1. Using a tri-roller coating machine

Figure 1:
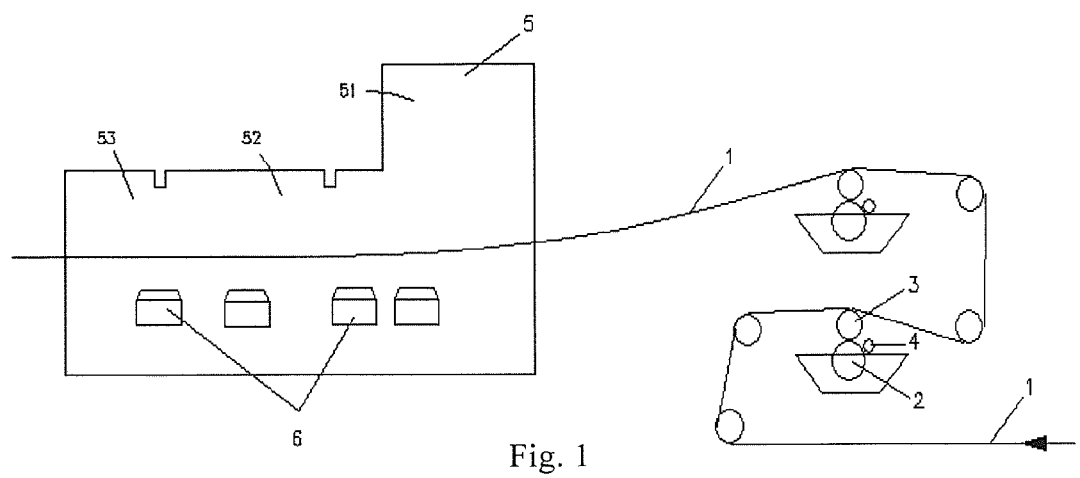
FIG. 1 is a schematic view of one embodiment according to the present invention.

As shown in FIG. 1, a strip steel 1 which has been milled and annealed, is coated on its upper surface and lower surface respectively by a pick-up roller 2 and a coating roller 3, wherein three rollers are used for coating, the viscosity of the coating liquid is 27 S, the speed ratio of the coating roller is 0.45, the speed ratio of the pick-up roller 2 is 0.41, and the gap or nip between the pick-up roller 2 and the metering roller 4 is 100 µm. Then, the strip steel 1 moves into a baking furnace 5 to form the film, wherein a three-section heating and cooling method is used for baking the coating into film. The three sections are: a drying section 51, a baking section 52, and a cooling section 53. The drying temperature is 350° C., the baking temperature is 320° C., and the solidification time of the film is 35 s. Finally, a uniform thick coating of good surface quality is obtained, with the films on the upper and lower surfaces being 5 µm, the coating adhesion being GT0, and the interlamination resistance being 900Ω·lam (European standard). The coating with parameters beyond the preferable range is of lower surface quality, with problems such as proneness to coming off, poor adhesion, and unevenness of coating surface.

Other embodiments are shown in Table 1.

TABLE 1

| Embodiment | Coating viscosity (S) | Speed ratio of coating roller | Speed ratio of pick-up roller | Gap between pick-up roller and metering roller (µm) | Drying temperature (° C.) | baking temperature (° C.) | Film forming time (second) | Coating thickness (µm) | Coating adhesion |
|---|---|---|---|---|---|---|---|---|---|
| 1 | 27 | 0.45 | 0.41 | 100 | 350 | 320 | 35 | 5 | GT0 |
| 2 | 10 | 0.80 | 1.50 | 100 | 400 | 350 | 33 | 6 | GT0 |
| 3 | 25 | 1.20 | 0.82 | 135 | 380 | 370 | 50 | 8 | GT1 |
| 4 | 30 | 0.20 | 0.30 | 80 | 330 | 280 | 38 | 2 | GT1 |
| 5 | 30 | 0.55 | 0.65 | 150 | 350 | 320 | 42 | 10 | GT1 |
| 6 | 35 | 0.32 | 0.24 | 105 | 100 | 270 | 144 | 4 | GT0 |
| 7 | 40 | 0.39 | 0.31 | 95 | 270 | 200 | 65 | 5 | GT0 |
| 8 | 60 | 0.28 | 0.20 | 110 | 250 | 280 | 72 | 7 | GT1 |
| 9 | 80 | 0.20 | 0.31 | 120 | 250 | 240 | 45 | 6 | GT0 |

2. Using a double-roller coating machine

Figure 2:
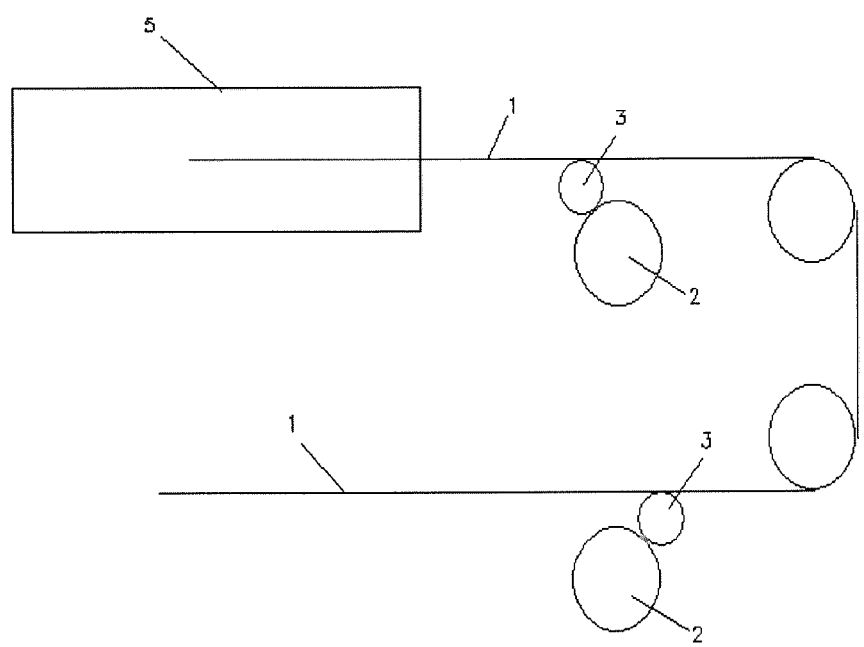
FIG. 2 is a schematic view of another embodiment according to the present invention.

As shown in FIG. 2, the strip steel 1 which has been milled and annealed, is coated on its upper surface and lower surface respectively by a pick-up roller 2 and a coating roller 3, wherein two rollers are used for coating, the viscosity of the coating liquid is 30 S, the speed ratio of the coating roller is 0.48, the speed ratio of the pick-up roller 2 is 0.40, and the pressure of the coating roller and the pick-up roller is. Then, the strip steel 1 moves into a baking furnace 5 to form the film, wherein a three-section heating and cooling method is used for baking the coating into film. The three sections are: a drying section 51, a baking section 52, and a cooling section 53. The drying temperature is 100° C., the baking temperature is 220° C., and the solidification time of the film is 72 s. Finally, a uniform thick coating of good surface quality is obtained, with the films on the upper and lower surfaces being 5 μm, the coating adhesion being GT0, and the interlamination resistance being 900Ω·lam (European standard). The coating with parameters beyond the preferable range is of lower surface quality, with problems such as proneness to coming off, poor adhesion, and unevenness of coating surface.

Other embodiments are shown in Table 2.

TABLE 2

| Embodiment | Coating adhesion (S) | Speed ratio of coating roller | Speed ratio of pick-up roller | Pressure of coating roller and pick-up roller (KPa) | Drying temperature (° C.) | Baking temperature (° C.) | Film forming time (second) | Coating thickness (μm) | Coating adhesion |
|---|---|---|---|---|---|---|---|---|---|
| 10 | 10 | 0.85 | 0.80 | 10 | 400 | 370 | 35 | 5.5 | GT0 |
| 11 | 25 | 1.00 | 0.95 | 30 | 180 | 300 | 50 | 7 | GT1 |
| 12 | 30 | 0.20 | 0.30 | 50 | 200 | 200 | 85 | 2 | GT0 |
| 13 | 35 | 0.32 | 0.20 | 20 | 100 | 270 | 60 | 4.5 | GT0 |
| 14 | 40 | 0.45 | 0.35 | 15 | 220 | 250 | 33 | 5 | GT0 |
| 15 | 60 | 1.50 | 1.00 | 5 | 150 | 220 | 144 | 8 | GT1 |
| 16 | 80 | 0.50 | 0.41 | 1 | 200 | 250 | 45 | 10 | GT0 |

The present invention is applicable to produce surface coatings on electrical steels in large hydropower generator or nuclear power generator and other electric motors with high requirements on insulation.

The invention claimed is:

1. A method of producing an extremely thick insulation coating on a surface of an electrical steel, comprising the following steps:
   1) preparing a coating liquid by stirring the coating liquid for 0.1~4 hours, then according to an original viscosity of the coating liquid, diluting the coating liquid with pure water or solvent to make sure that the viscosity of the coating liquid is within 10~80 S;
   2) coating a strip steel by coating an upper surface and a lower surface of the strip steel with the coating liquid using a double-roller coating machine in two coating ways, said two coating ways comprising co-current coating and counter-current coating,
   wherein in the double-roller coating machine, both the speed ratios of a pick-up roller and a coating roller are 0.2~1.5, and the pressure between the two rollers is 1~50 KPa;
   3) baking the coating using burner nozzles to provide heated air, wherein the heated air circulates through a vertical circulation bellow, drying a wet film on the surfaces of the strip steel and solidifying a wet film;
   baking the coating in three sections, said three sections comprising a drying section, a baking section, and a cooling section, wherein the temperature in the drying section is 100~400° C., and the temperature in the baking section is 200~370° C.; the time in the whole drying and baking sections is 33~144 seconds, wherein the time in the drying section is 9~39 seconds, and the time in the baking section is 24~105 seconds; wherein a coating with film thickness of 2~10 μm is finally formed,
   wherein in the baking process, the strip steel having been coated is conveyed in a non-contact way, in which the strip steel is conveyed by blowing pressure-adjustable air onto the lower surface of the strip steel to make the strip steel float; the air pressure is adjustable within 1~2000 Pa according to the thickness of the strip steel; wherein the wet film is kept out of contact with a furnace roller before the wet film is solidified, so as to guarantee that the surface of the wet film is left intact.

2. The method of producing an extremely thick insulation coating on a surface of an electrical steel according to claim 1, characterized in that the method further comprises step 4): online detecting of the film thickness using an online detection method to continuously detect the film thickness on both the upper surface and the lower surface of the strip steel, and by comparing the result of the film thickness during the online detection with a target thickness, adjusting the coating machine in due time to achieve the target thickness, so as to ensure a uniform film thickness.

3. The method of producing an extremely thick insulation coating on a surface of an electrical steel according to claim 1, characterized in that in the step 1) of preparing the coating liquid, the solvent for adjusting the viscosity comprises ethylene glycol butyl ether or butyl glycol.

4. A method of producing an extremely thick insulation coating on a surface of an electrical steel, comprising the following steps:
   1) preparing a coating liquid by stirring the coating liquid for 0.1~4 hours until thoroughly mixed, then according to an original viscosity of the coating liquid, diluting the coating liquid with pure water or solvent to make sure that the viscosity of the coating liquid is within 10~80 S;
   2) coating a strip steel by coating an upper surface and a lower surface of the strip steel with the coating liquid using a tri-roller coating machine, in two coating ways, said two coating ways comprising co-current coating and counter-current coating, wherein in the tri-roller coating machine, both the speed ratios of a coating roller and a pick-up roller are 0.2~1.2; and the pressure between the two rollers is 0.1~10 KPa; the gap between the pick-up roller and a metering roller is 80~150 μm;
   3) baking the coating using burner nozzles to provide heated air, wherein the heated air circulates through a vertical circulation bellow, drying the wet film on the surfaces of the strip steel and solidifying the wet film;

baking the coating in three sections, said three sections comprising a drying section, a baking section, and a cooling section, wherein the temperature in the drying section is 100~400° C., the temperature in the baking section is 200~370° C.; the time in the whole drying and baking sections is 33~144 seconds, wherein the time in the drying section is 9~39 seconds, and the time in the baking section is 24~105 seconds; wherein a coating with film thickness of 2~10 μm is finally formed, wherein in the baking process, the strip steel having been coated is conveyed in a non-contact way, in which the strip steel is conveyed by blowing pressure-adjustable air onto the lower surface of the strip steel to make the strip steel float; the air pressure is adjustable within 1~2000 Pa according to the thickness of the strip steel; wherein the wet film is kept out of contact with any furnace rollers before the wet film is solidified, so as to guarantee that the surface of the wet film is intact.

5. The method of producing an extremely thick insulation coating on a surface of an electrical steel according to claim 4, characterized in that the method further comprises step 4): online detecting of the film thickness using an online detection method to continuously detect the film thickness on both the upper surface and the lower surface of the strip steel, and by comparing the result of the film thickness during the online detection with a target thickness, adjusting the coating machine in due time to achieve the target thickness, so as to ensure a uniform film thickness.

6. The method of producing an extremely thick insulation coating on a surface of an electrical steel according to claim 4, characterized in that in the step 1) of preparing the coating liquid, the solvent for adjusting the viscosity comprises ethylene glycol butyl ether or butyl glycol.

* * * * *